(12) United States Patent
Kwok et al.

(10) Patent No.: US 6,707,527 B1
(45) Date of Patent: Mar. 16, 2004

(54) BISTABLE TWISTED NEMATIC LIQUID CRYSTAL DISPLAYS WITH TWIST ANGLE OF ±11 DEGREES

(75) Inventors: Hoi-Sing Kwok, Kowloon (HK); Shu-Tuen Tang, Shatin (HK)

(73) Assignee: The Hong Kong University of Science and Technology, Hong Kong (HK)

( * ) Notice: Subject to any disclaimer, the term of this patent is extended or adjusted under 35 U.S.C. 154(b) by 0 days.

(21) Appl. No.: 09/573,178

(22) Filed: May 19, 2000

Related U.S. Application Data

(60) Provisional application No. 60/135,652, filed on May 24, 1999.

(51) Int. Cl.⁷ .............................................. C09K 19/02
(52) U.S. Cl. ...................................... 349/179; 349/180
(58) Field of Search ......................... 349/33–55, 84–186

(56) References Cited

U.S. PATENT DOCUMENTS

| | | |
|---|---|---|
| 4,505,548 A | 3/1985 | Berreman et al. |
| 4,529,271 A | 7/1985 | Berreman et al. |
| 2001/0005246 A1 * | 6/2001 | Takiguchi et al. .......... 349/117 |

* cited by examiner

Primary Examiner—Robert H. Kim
Assistant Examiner—T L Rude
(74) Attorney, Agent, or Firm—Burns, Doane, Swecker & Mathis, L.L.P.

(57) ABSTRACT

The present invention provides the conditions for new bistable twisted nematic liquid crystal displays, in particular the necessary twist angles, liquid crystal retardation values, input and output polarizer angles, for both transmissive and reflective liquid crystal displays.

3 Claims, 5 Drawing Sheets

BISTABLE TWISTED NEMATIC LIQUID CRYSTAL DISPLAYS WITH TWIST ANGLE OF ±11 DEGREES

This application claims priority under 35 U.S.C. §§119 and/or 365 to U.S. Ser. No. 60/135,652 filed in the United States on May 24, 1999; the entire content of which is hereby incorporated by reference.

FIELD OF THE INVENTION

This invention deals with the fabrication parameters for making bistable twisted nematic liquid crystal displays. In particular, the conditions of the twist angles and the retardation of the liquid crystal cell in order to optimize its optical properties such as the contrast ratio, the viewing brightness and the viewing angle are given.

BACKGROUND OF THE INVENTION

Bistable twisted nematic (BTN) displays are displays which possess at least 2 stable twist states under a zero voltage condition. The first such device was reported by Berreman in 1981. A patent on this display was issued in 1985. This BTN display has the advantage that, unlike an ordinary LCD, no holding voltage is needed to display the images. At zero volts, the alignment of the BTN can take on either of two twist states, depending on the choice of the rubbing directions of the alignment layers and the d/p ratio, where d, p are the thickness and pitch of the LC cell respectively.

The physics of the BTN lies in the interaction between the cell boundary conditions and the natural twist of the LC material. If the rubbing of the alignment layers favors a twist angle of $\phi$, and if the natural twist of the nematic LC itself is $\phi+\pi$, then the twist states $\phi$ and $\phi+2\pi$ are equally stable (or metastable). Hence, for bistability to occur, the d/p ratio of the LC cell should be $\sim(0.5+\phi/2\pi)$.

The optical properties of the BTN depends strongly on the input polarizer angle $\alpha$, the output polarizer angle $\gamma$, the twist angle $\phi$, and the thickness—birefringence product $d\Delta n$ of the LC cell. So far, only a few combinations of ($\phi$, $\phi+2\pi$) have been successfully made, including the (−90°, 270°), (0°, 360°) and (90°, 450°) BTNs. However, none of these BTN possesses all the desired qualities of high brightness, high contrast, low color dispersion, and low sensitivity to $d\Delta n$ changes (thus ease of fabrication). It is the purpose of this invention to disclose many possible combinations of ($\alpha$, $\gamma$, $\phi$, $d\Delta n$) that can produce BTNs with excellent optical properties and ease of fabrication.

SUMMARY OF THE INVENTION

The present invention gives the fabrication conditions of liquid crystal cells and the input/output polarizer angles in order to achieve excellent optical quality bistable twisted nematic liquid crystal displays. The conditions to be detailed are the twist angle $\phi$, the thickness of the liquid crystal cell d, the liquid crystal birefringence $\Delta n$, the input polarizer angle $\alpha$, and the output polarizer angle $\gamma$.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
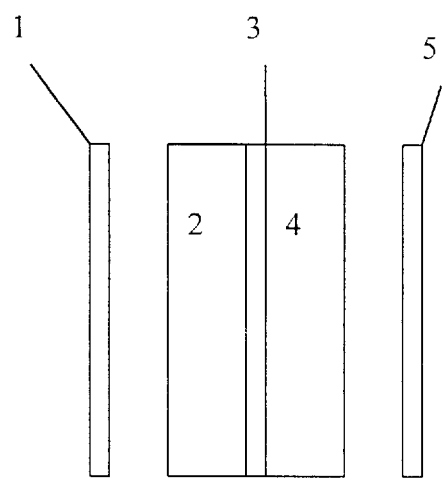
FIG. 1 shows the basic structure of a bistable twisted nematic liquid crystal display.
Figure 2:
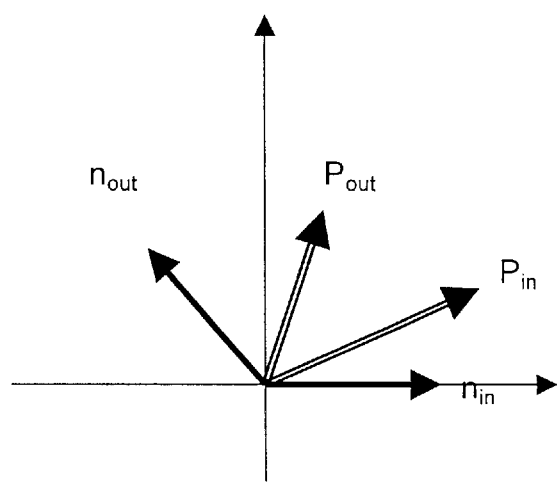
FIG. 2 shows the relative angles between the various vectors.

A bistable twisted nematic LCD consists of an input polarizer 1, a liquid crystal cell assembly comprising glass 2 and 4 and liquid crystal layer 3, and an output polarizer 5. The liquid crystal layer 3 is characterized by a twist angle of $\phi$, which is the angle between the input director $n_{in}$ and the output director $n_{out}$ of the LC cell. The condition of having a certain twist angle for the LC cell is obtained by rubbing the alignment layers on the 2 pieces of glass 2 and 4 appropriately. The bistable twist states of the BTN are $\phi$ and $\phi+2\pi$.

The input polarizer $P_{in}$ is at an angle of $\alpha$ to $n_{in}$, while the output polarizer $P_{out}$ is at an angle of $\gamma$ to $n_{in}$. The liquid crystal cell has a thickness of d and a birefringence of $\Delta n$. The set of parameters ($\alpha$, $\gamma$, $\phi$, $d\Delta n$) defines the optical properties of the BTN completely. In this invention, we disclose a method to obtain all the possible sets of ($\alpha$, $\gamma$, $\phi$, $d\Delta n$) values that can produce an excellent optical quality BTN. This method is based on the parameter space and Poincare sphere approach to investigate the polarization change of a light beam as it passes through a twisted nematic LC cell.

DETAILS OF THE CALCULATIONS

The polarization Stokes vector of the output can be obtained by calculating the Mueller matrix of the LC cell. The Mueller matrix representation of a general twisted liquid crystal cell $U_M$ can be obtained from its Jones matrix $U_J$ by the following formula $$U_M = T \cdot (U_J \otimes U^*_J) \cdot T^{-1} \tag{1}$$

where $$T = \begin{pmatrix} 1 & 0 & 0 & 0 \\ 1 & 0 & 0 & -1 \\ 0 & 1 & 1 & 0 \\ 0 & i & -i & 0 \end{pmatrix} \text{ and} \tag{2}$$

$$U_J \otimes U^*_J = \begin{pmatrix} u_{11}u^*_{11} & u_{11}u^*_{12} & u_{12}u^*_{11} & u_{12}u^*_{12} \\ u_{11}u^*_{21} & u_{11}u^*_{22} & u_{12}u^*_{21} & u_{12}u^*_{22} \\ u_{21}u^*_{11} & u_{21}u^*_{12} & u_{22}u^*_{11} & u_{22}u^*_{12} \\ u_{21}u^*_{21} & u_{21}u^*_{22} & u_{22}u^*_{21} & u_{22}u^*_{22} \end{pmatrix} \tag{3}$$

The resultant Mueller matrix can therefore be written as $$U_M = \begin{pmatrix} 1 & 0 & 0 & 0 \\ 0 & a^2+b^2-c^2-d^2 & 2(bd-ac) & -2(ad+bc) \\ 0 & 2(ac+bd) & a^2-b^2-c^2+d^2 & 2(ab-cd) \\ 0 & 2(ad-bc) & -2(ab+cd) & a^2-b^2+c^2-d^2 \end{pmatrix} \quad (4)$$

We can denote this as $$U_M = \begin{pmatrix} 1 & 0 & 0 & 0 \\ 0 & A & B & C \\ 0 & D & E & F \\ 0 & G & H & I \end{pmatrix} \text{ where} \quad (5)$$

$$a = \cos\phi\cos\beta + \frac{\phi}{\beta}\sin\phi\sin\beta \quad (6)$$

$$b = \frac{\delta}{\beta}\cos\phi\sin\beta$$

$$c = \sin\phi\cos\beta - \frac{\phi}{\beta}\cos\phi\sin\beta$$

$$d = \frac{\delta}{\beta}\sin\phi\sin\beta$$

Here $\delta = \pi d\Delta n/\lambda$ and $\beta^2 = \delta^2 + \phi^2 \cdot \lambda$ is the wavelength of incident light as usual.

Assuming that the input light is linearly polarized at an angle $\alpha$ to the x-axis and the input director of the LC cell, the resultant Stokes vector S' of the light after passing through the LC cell is given by $$S' = \begin{pmatrix} 1 \\ A\cos 2\alpha + B\sin 2\alpha \\ D\cos 2\alpha + E\sin 2\alpha \\ G\cos 2\alpha + H\sin 2\alpha \end{pmatrix} \quad (7)$$

Equation (7) is the most important one in obtaining the conditions of the LC cell in the present invention. It may be used to find out the conditions for linear polarization output, as well as circular polarization output. Linear polarization output means that if an output polarization is placed at the correct orientation, the transmission of the BTN will either be 100% or 0%. This is exactly what is desired for a high contrast BTN. It should also be noted from eq. (7) that the polarization state of the output is uniquely determined by the set of parameters ($\alpha$, $\gamma$, $\phi$, $\delta$).

There are 3 types of solutions to equation (7) that lead directly to the present invention. They correspond to 2 situations of linear polarized light output, and circularly polarized light output.

A linearly polarized output requires that G cos $2\alpha$+H sin $2\alpha$=0. Hence $$\frac{\phi\delta}{\beta^2}\sin^2\gamma\cos 2\alpha + \frac{\delta}{\beta}\sin\beta\cos\beta\sin 2\alpha = 0 \quad (8)$$

The solution of this equation gives rise to the 2 types of linear polarization output.

(1) Type I Linear Polarization Output (LPI):
This is given by $$\delta^2 + \beta^2 = (N\pi)^2 \quad (9)$$

and $\gamma = \phi + \alpha$ \quad (10)

(2) Type II Linear Polarization Output (LPII):
This is given by $$\frac{\phi}{\sqrt{\delta^2+\phi^2}}\tan\sqrt{\delta^2+\phi^2} = \tan 2\alpha \quad (11)$$

and $\gamma = \phi - \alpha$ \quad (12)

(3) Circular Polarization Output (CP):

$$\frac{\delta^2}{\delta^2+\phi^2}\sin^2\sqrt{\phi^2+\delta^2} = \frac{1}{2} \text{ and} \quad (14)$$

$$\tan 2\alpha = \frac{-\sqrt{\delta^2+\phi^2}}{\phi}\cot\sqrt{\delta^2+\phi^2} \quad (15)$$

Figure 3:
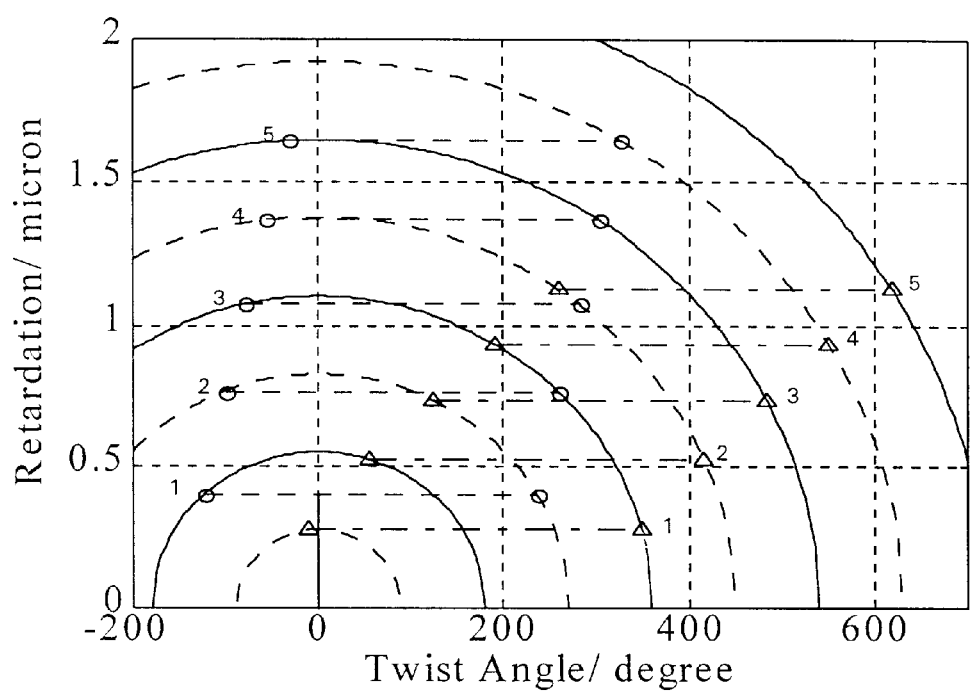
FIG. 3 shows the parameter space of the BTN LCD.
Figure 6:
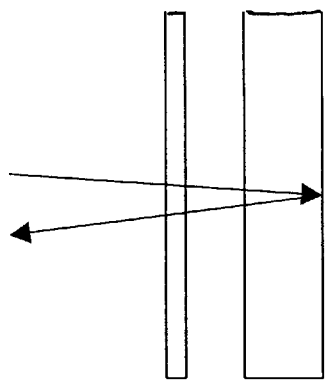
FIG. 6 shows the basic structure of the one-polarizer reflective BTN LCD.

FIG. 3 depicts all the LPI and LPII solutions on a parameter space with $\delta$ and $\phi$ as the free parameters. FIG. 6 shows the CP solutions together with the LPI solutions.

In one preferred embodiment of the invention, there is provided a transmissive bistable twisted nematic liquid crystal display. The bistable twisted nematic LCD consists of an input polarizer 1, a liquid crystal cell assembly comprising glass 2 and 4 and liquid crystal layer 3, and an output polarizer 5. The liquid crystal layer 3 is characterized by a twist angle of $\phi$, which is the angle between the input director $n_{in}$ and the output director $n_{out}$ of the LC cell. The condition of having a certain twist angle for the LC cell is obtained by rubbing the alignment layers on the 2 pieces of glass 2 and 4 appropriately. The bistable twist states of the BTN are $\phi$ and $\phi+2\pi$. The input polarizer $P_{in}$ is at angle of $\alpha$ to $n_{in}$, while the output polarizer $P_{out}$ is at an angle of $\gamma$ to $n_{in}$. The liquid crystal is doped with a chiral dopant of appropriate handedness and concentration to achieve bistability. The dopant usually produces a natural pitch of the liquid crystal which is in between $2\pi d/\phi$ and $2\pi d/(\phi+2\pi)$.

For a transmissive BTN LCD, the conditions can be obtained from the parameter space diagram given in FIG. 3. The conditions required are:

1. The retardations of both the on and off states are the same.
2. Their twist angles differ by $2\pi$.
3. The on and off states are LP modes of different kinds.
4. Their output linear polarization angles of the on and off states are perpendicular to each other.

Properties 2,3 and 4 lead to $\alpha = \pm 45°$. Properties 1, 2 and 3 restrict the solutions to some particular $\delta$ and $\phi$ values. Table 1 lists the conditions of all the angles and cell conditions needed to completely specify the BTN LCD for $\phi_1 < 180°$.

TABLE 1

BTN LCD construction conditions using LP solutions

| Mode number | $d\Delta n/\mu m$ | $\phi_1$ | $\phi_2$ | $\alpha$ | $\gamma$ |
|---|---|---|---|---|---|
| 1 | 0.3995 | −124 | 236 | 45 | −79 |
| 2 | 0.765 | −101 | 259 | 45 | 34 |
| 3 | 1.0735 | −79 | 281 | 45 | −34 |
| 4 | 1.364 | −57 | 303 | 45 | 78 |
| 5 | 1.647 | −33 | 327 | 45 | 12 |
| 6 | 0.273 | −11 | 349 | 45 | −56 |
| 7 | 1.925 | −11 | 349 | 45 | −56 |
| 8 | 2.200 | 11 | 371 | 45 | 56 |
| 9 | 2.473 | 34 | 394 | 45 | −11 |

TABLE 1-continued

BTN LCD construction conditions using LP solutions

| Mode number | dΔn/μm | $\phi_1$ | $\phi_2$ | α | γ |
|---|---|---|---|---|---|
| 10 | 2.745 | 56 | 416 | 45 | −79 |
| 11 | 0.522 | 56 | 416 | 45 | −79 |
| 12 | 0.733 | 124 | 484 | 45 | 79 |
| 13 | 0.932 | 191 | 551 | 45 | 56 |

Since there is symmetry in right and left twist, a BTN LCD with $\phi_1$, $\phi_2$ and γ that are all opposite in sign to those listed in Table 1 will also give the same optical properties. They are shown in Table 2.

TABLE 2

BTN LCD construction conditions using LP solutions

| Mode number | dΔn/μm | $\phi_1$ | $\phi_2$ | α | γ |
|---|---|---|---|---|---|
| 1 | 0.3995 | 124 | −236 | 45 | 79 |
| 2 | 0.765 | 101 | −259 | 45 | −34 |
| 3 | 1.0735 | 79 | −211 | 45 | 34 |
| 4 | 1.364 | 57 | −303 | 45 | −78 |
| 5 | 1.647 | 33 | −327 | 45 | −12 |
| 6 | 0.273 | 11 | −349 | 45 | 56 |
| 7 | 1.925 | 11 | −349 | 45 | 56 |
| 8 | 2.200 | 11 | 371 | 45 | 56 |
| 9 | 2.473 | −34 | −394 | 45 | 11 |
| 10 | 2.745 | −56 | −416 | 45 | 79 |
| 11 | 0.522 | −56 | −416 | 45 | 79 |
| 12 | 0.733 | −124 | −484 | 45 | −79 |
| 13 | 0.932 | −191 | −551 | 45 | −56 |

Notice that for both Table 1 and Table 2, the output polarizer angles are given to within the range of −90° to 90°. It is because that a polarizer at angle γ is the same as one at angle γ+π.

Additionally, for any mode listed in Table 1 and 2, it is possible to change the sign of α and the BTN LCD will also function with the bright and dark states reversed. So these combinations are also possible and are part of the present invention.

In principle, there are an infinite number of possibilities for the operating modes of the BTN LCD. In Tables 1 and 2, only those that have twist angles smaller than 551° are listed. The reason is that as the twist angle becomes larger, it is more and more difficult to obtain bistability of the twist states. Experience is that the d/p ratio becomes very sensitive for large twist angles and the BTN obtained are not practical.

Figure 4:
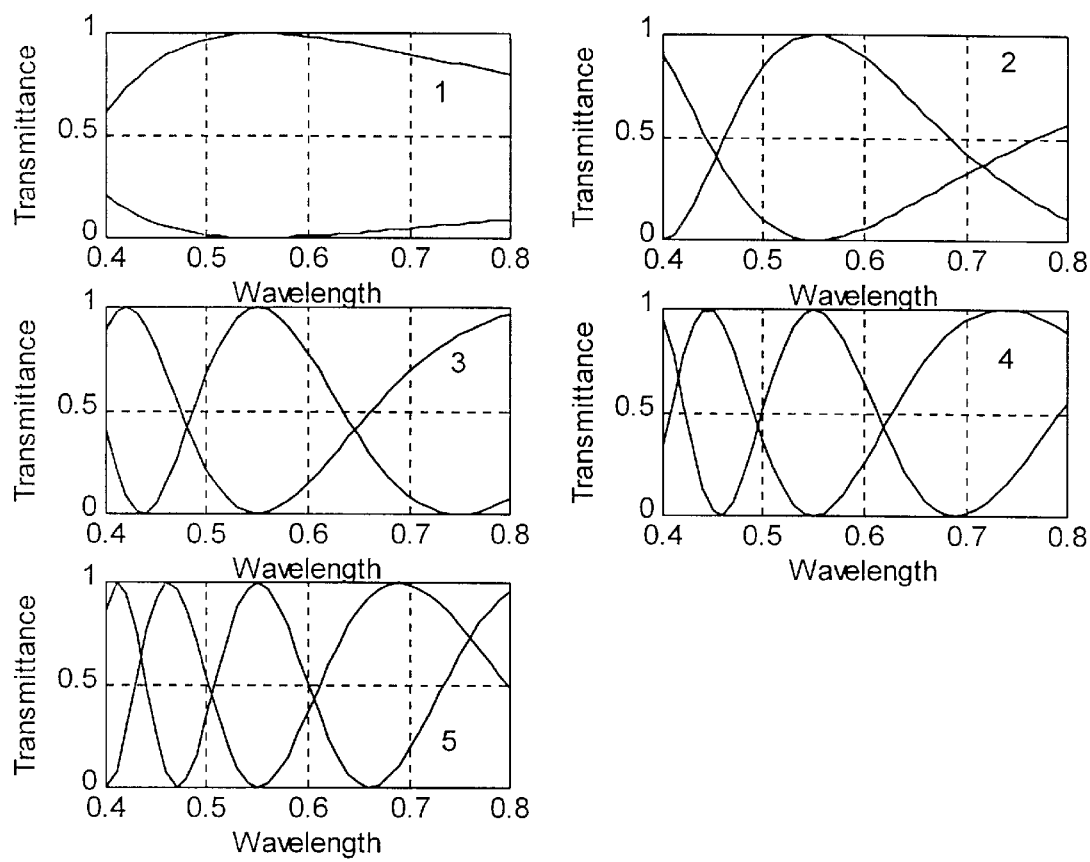
FIG. 4 shows the on and off state transmittance spectra of the various operating conditions using LPI solutions.
Figure 5:
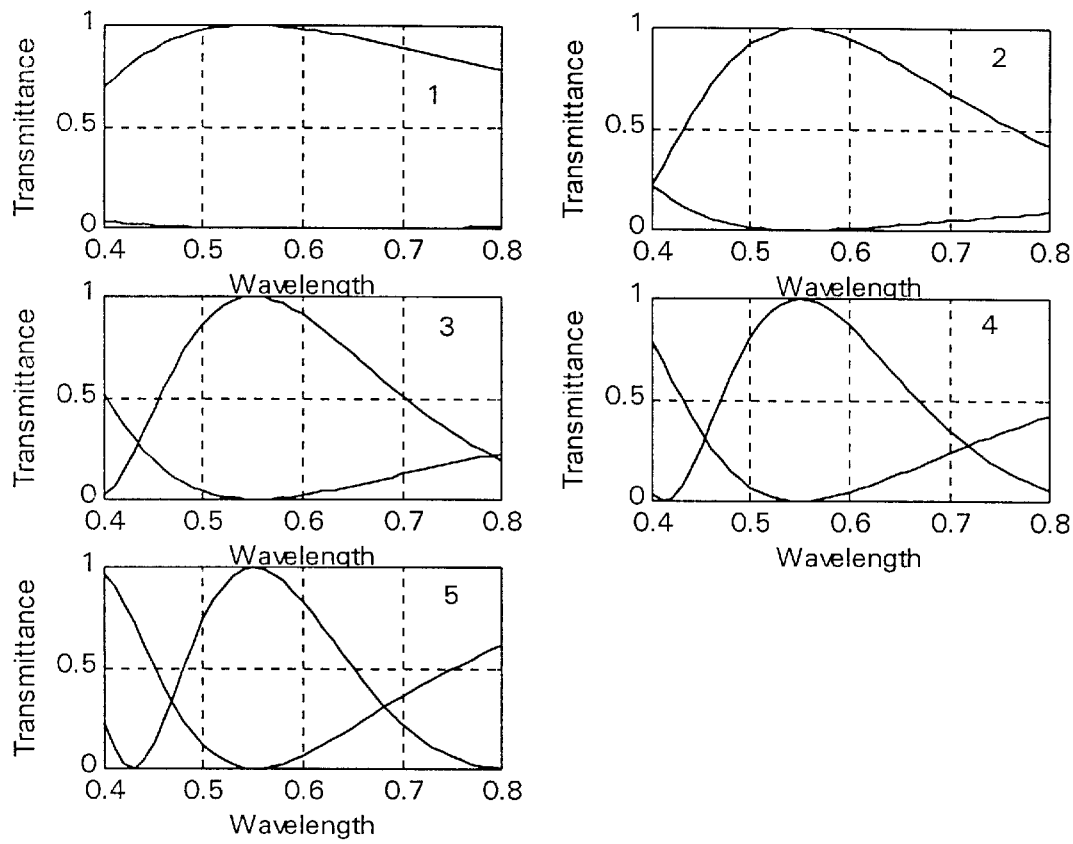
FIG. 5 shows the on and off state transmittance spectra of the various operating conditions using LPII solutions.

FIGS. 4 and 5 show the theoretical transmittance spectra of some of the modes indicated in Table 1. FIG. 4 refers to those arising from the LPI solutions and FIG. 5 refers to those for the LPII solutions. In the transmittance spectra, the on and off states are shown. These curves are important in determining the colors of the on and off states of the BTN LCD, as well as its sensitivity to changes in retardation. It is generally true that if the transmittance spectrum is insensitive to wavelength, then the LCD is insensitive to changes in the retardation value of the liquid crystal. The insensitivity of the transmittance to the retardation is important in manufacturing. Judging from FIG. 4, the BTN LCD modes discovered here are excellent in terms of dispersion and manufacturability.

In another preferred embodiment of the present invention, the output polarizer is removed and a reflective BTN LCD is formed as shown in FIG. 6. It consists of the input polarizer at angle α to the input director $n_{in}$ of the liquid crystal cell. The liquid crystal cell consists of 2 pieces of glass with a thin layer of liquid crystal in between. A rear reflector is placed in the back of the display or placed inside the liquid crystal cell.

Figure 7:
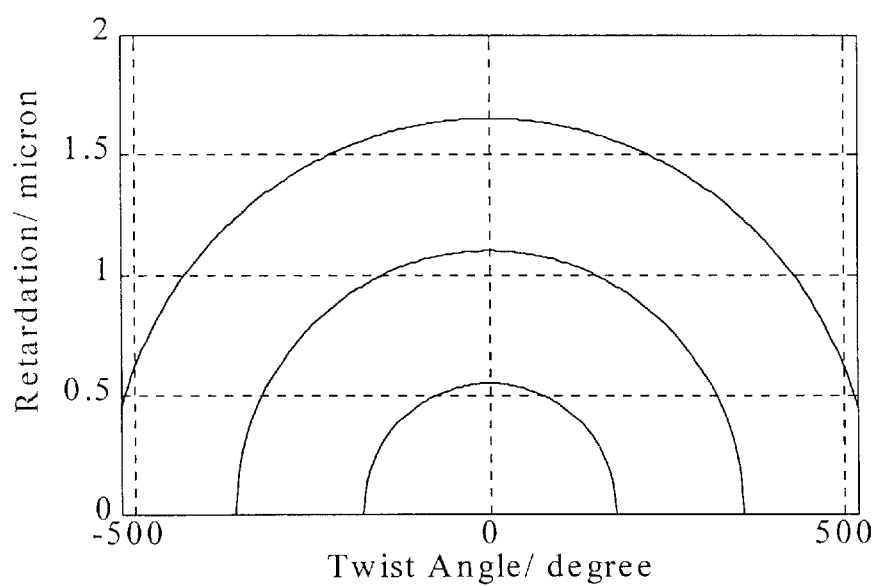
FIG. 7 shows the parameter space of the one-polarizer reflective BTN LCD.

The reflective BTN LCD with one-polarizer requires the LC cell to behave as a quarterwave retardation plate in turning the linear polarization of the input into circular polarization. Upon reflection, the circular polarization will become linear polarization again with a rotation of the polarization axis by 90°. There are 2 possibilities: (1) Switching between LPI modes and CP modes, and (2) Switching between LPII and CP modes. Table 3 below shows the construction conditions for these reflective BTN LCD with one polarizer. The parameter space for the BTN using this approach is shown in FIG. 7.

TABLE 3

Construction conditions of reflective BTN LCD with one polarizer.

| Mode number | dΔn | $\phi_1$ | $\phi_2$ | α |
|---|---|---|---|---|
| 1 | 0.4 | −25 | 335 | −40 |
| 2 | 0.6 | 190 | 550 | 10 |
| 3 | 0.66 | −70 | 290 | 36 |
| 4 | 0.94 | −31.5 | 328.5 | 0 |

Because of the large dispersion when the retardation is larger than 1 μm, therefore only solutions with retardation less than 1 μm are considered. Solutions with retardation less than 0.3 μm are also ignored.

What is claimed is:

1. A bistable transmittive twisted nematic liquid crystal display, comprising:
   a. a liquid crystal cell formed by two pieces of glass with transparent electrodes and alignment layers on the inner surfaces of said pieces of glass,
   b. the input director direction and an output director direction of the liquid crystal cell being defined by properly treating the alignment layers on the glass surfaces, the angle between the directors being the twist angle $\phi=\pm 11°$, the thickness of the liquid crystal layer being denoted by d and the birefringence of the liquid crystal being denoted by Δn, such that dΔn=0.27 μm,
   c. an input polarizer at an angle α=±45° to the input director of the liquid crystal cell,
   d. an output polarizer at an angle γ=±56° to the input director of the liquid crystal cell, and
   e. the liquid crystal being doped with a chiral dopant of appropriate handedness and concentration so that bistability is achieved, the dopant producing a natural pitch of the liquid crystal which is between 2πd/φ and 2πd/(φ+2π).

2. A liquid crystal display as claimed in claim 1, wherein a ratio d/p of the thickness of the crystal layer (d) to the pitch (p) of the liquid crystal cell has a value of approximately 0.5+φ/2π.

3. The bistable transmittive twisted nematic liquid crystal display of claim 1, further comprising:
   nematic structures such that the twist angle φ of the liquid crystal cell and the natural twist angle of the nematic structures are offset by 180°.

* * * * *